US006551384B1

(12) United States Patent
Ackley et al.

(10) Patent No.: US 6,551,384 B1
(45) Date of Patent: Apr. 22, 2003

(54) MEDICAL OXYGEN CONCENTRATOR

(75) Inventors: Mark William Ackley, East Aurora, NY (US); Guoming Zhong, Getzville, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/897,960

(22) Filed: Jul. 5, 2001

(51) Int. Cl.$^7$ .............................................. B01D 53/047
(52) U.S. Cl. .............................. 95/96; 95/130; 96/130; 96/143
(58) Field of Search ........................ 95/96–98, 100–105, 95/130; 96/109, 113–115, 130, 143, 144

(56) References Cited

U.S. PATENT DOCUMENTS

| 4,194,891 | A | * | 3/1980 | Earls et al. ................ 96/130 X |
| 4,648,888 | A | * | 3/1987 | Rowland .................. 96/114 X |
| 4,681,099 | A | * | 7/1987 | Sato et al. ............. 128/204.23 |
| 4,822,384 | A | * | 4/1989 | Kato et al. ................ 96/113 X |
| 4,859,217 | A | | 8/1989 | Chao .............................. 55/68 |
| 5,071,449 | A | | 12/1991 | Sircar ............................ 95/98 |
| 5,122,164 | A | * | 6/1992 | Hirooka et al. ........... 96/130 X |
| 5,366,541 | A | | 11/1994 | Hill et al. ...................... 96/124 |
| 5,474,595 | A | | 12/1995 | McCombs .................... 95/23 |
| 5,531,807 | A | * | 7/1996 | McCombs ................ 95/130 X |
| 5,711,787 | A | * | 1/1998 | Neill et al. ................ 95/130 X |
| 5,713,984 | A | * | 2/1998 | Monnot et al. ........... 95/130 X |
| 5,735,268 | A | * | 4/1998 | Chura et al. ............ 128/204.23 |
| 5,827,358 | A | | 10/1998 | Kulish et al. .................. 96/115 |
| 5,871,564 | A | | 2/1999 | McCombs ....................... 95/98 |
| 6,146,447 | A | * | 11/2000 | Sircar et al. .............. 95/130 X |
| 6,171,370 | B1 | * | 1/2001 | Hirano et al. ............. 95/130 X |
| 6,261,344 | B1 | * | 7/2001 | Labasque et al. ......... 95/130 X |
| 6,346,139 | B1 | * | 2/2002 | Czabala ....................... 95/130 |
| 6,348,082 | B1 | * | 2/2002 | Murdoch et al. ......... 96/113 X |
| 6,372,026 | B1 | * | 4/2002 | Takemasa et al. ........ 96/130 X |

FOREIGN PATENT DOCUMENTS

| WO | WO9943415 | 9/1999 |
| WO | WO9943416 | 9/1999 |

OTHER PUBLICATIONS

R.H. Kaplan et al., "Advvances In The Design Of Medical Oxygen Concentrators", pp. 1–6, (AIChE Meeting, Nov. 7, 1989. San Francisco).

* cited by examiner

*Primary Examiner*—Robert H. Spitzer
(74) *Attorney, Agent, or Firm*—Robert J. Follett

(57) ABSTRACT

An advanced medical concentrator process and system is provided using fast cycle and advanced adsorbent. Significant improvements achieved results in a smaller, lighter and more efficient system in comparison with the current commercial stationary concentrators. Integrated with a conserver, a small portable concentrator is achieved.

43 Claims, 5 Drawing Sheets

Representative Process Cycle

MEDICAL OXYGEN CONCENTRATOR

FIELD OF THE INVENTION

This invention provides an advanced medical oxygen concentrator process and system. More specifically, the invention achieves a compact, light weight and low power medical oxygen concentrator using a fast PSA (pressure swing adsorption) cycle and advanced adsorbents. The invention provides significant system improvements and cost savings over commercial stationary medical concentrators. Also, when integrated with a conserver, the invention provides a truly portable unit.

BACKGROUND OF THE INVENTION

A growing number of people need oxygen to alleviate respiratory insufficiency. Although home oxygen can be provided by liquid or high pressure cylinders, more recently medical oxygen concentrators have become a cost effective and preferred system.

Most oxygen concentrators are based on pressure swing adsorption (PSA) including vacuum swing adsorption (VSA) or vacuum pressure swing adsorption (VPSA). PSA is a well-known art for separating oxygen from air for various applications ranging from a few liters per minute (LPM) in medical concentrators to several hundred tons per day of oxygen (TPDO) in industrial scale plants.

While a medical concentrator and large scale industrial plant share the same PSA fundamentals, it is the nature and scale of their applications that differentiate the two. Components of a PSA system contribute differently between the medical concentrator and the large scale plant to the overall cost. For example, while adsorbent and vessel normally represent a large contribution to the overall cost in the large scale plant, the compressor is the single largest component for medical concentrators. In addition, because a medical concentrator is for home use, its size and weight are critical performance parameters, especially for a portable unit. Conversely, in a large scale plant, system size and weight are not particularly important other than their effects on the overall oxygen cost.

It is well known that the overall PSA performance depends primarily on the inter-relationship of three parameters: BSF (the amount of adsorbent required to produce a given quantity of oxygen per unit of time (lbs/TPDO)), recovery (where oxygen recovery is defined as the ratio of the oxygen in the product to the oxygen in the feed) and power consumption (the overall power consumed in a process per unit of product produced, also known as specific power). Thus, while a small BSF may reduce the adsorbent cost, this may be offset by decreased product recovery and higher power consumption. Power consumption becomes a significant issue, especially with portable units powered by a battery.

Medical concentrator design must consider not only the cost and power consumption, but also the system size, weight and comfort. Most efforts in the prior art of oxygen concentrators have been focused on developing small and economic systems.

Typical commercial concentrators use zeolite adsorbents such as 5A, 13X or Oxysiv-7 (LiX ($SiO_2/Al_2O_3$=2.5) available from UOP, Des Plaines, Ill. USA). Highly exchanged LiX adsorbents are illustrated by Chao in U.S. Pat. No. 4,859,217.

A more advanced LiX adsorbent with $SiO_2/Al_2O_3$=2.0 was recently disclosed by Chao and Pontonio (WO 99/43415). This adsorbent was exploited by Ackley and Leavitt (WO 99/43416), and Ackley and Smolarek (WO 99/43418) to achieve fast PSA cycles in the production of oxygen.

Norman R. McCombs (U.S. Pat. No. 5,474,595) disclosed a medical concentrator based on a two-bed PSA and having a capacity control system disposed upstream of the compressor for power reduction.

Charles C. Hill and Theodore B. Hill (U.S. Pat. No. 5,366,541) disclosed a medical concentrator employing a rotary distribution valve instead of a number of conventional solenoid valves. This design simplified the conventional concentrator system and was more compact and reliable.

R. H. Kaplan et al. (AIChE Meeting, Nov. 7, 1989, San Francisco) traced developments in the design of concentrators and selected a rapid PSA (RPSA) system. Using a three-bed system and small adsorbent particles (40×80 beads, or diameter ~0.25 mm), the cycle time was reduced to as low as 2.4 s. The present inventors calculate that bed size factor (BSF), was about 200 lbs/TPDO when operating at an adsorption pressure of 30 psig and a desorption pressure that is atmospheric, (e.g. an adsorption/desorption pressure ratio of ~3). The corresponding adsorbent weight based on a standard 5 LPM capacity was then determined to be about 2.2 lb. This BSF (e.g. 2.2 lbs/5 LPM oxygen) was about two times smaller than that obtained by other conventional PSA concentrators. However, the achieved oxygen recovery was only about 25%. This recovery is very low compared with large scale VPSA processes which achieve as much as ~60% to 70%. Because of the low recovery a large air compressor is required. Also, the pressure drop in this RPSA system was large, about 8 psi/ft at 1 fps superficial velocity compared with less than 1 psi/ft in large $O_2$ PSA plants. The low recovery and high pressure drop result in a concentrator having a relatively high power consumption.

Stanley Kulish and Robert P. Swank (U.S. Pat. No. 5,827,358) disclosed another rapid PSA oxygen concentrator. It employed at least three adsorbent beds, and a process cycle of approximately 1~2 seconds (s) for the adsorption step and 5~10s for the desorption step. Using a six-bed configuration, the rapid cycle allowed for a BSF we estimate to be about 125 lb/TPDO at a pressure ratio of about three. Thus the adsorbent inventory is about 1.3 lb for 5 LPM capacity system. No recovery result was disclosed.

Sircar, in U.S. Pat. No. 5,071,449 disclosed a single bed RPSA cycle having a continuous feed and a cycle time ranging from six to sixty seconds.

Typical parameters for prior art oxygen concentrators are summarized in Table 1.

TABLE 1

| | | Prior Art Concentrators | | | |
|---|---|---|---|---|---|
| | | | Performance | | |
| Systems | Process | Pressure ratio | BSF (lb/TPD) | Recovery (%) | Power (kW/TPD) |
| Commercial concentrators | (V)PSA | ~3–5 | ~400 or greater | ~35 or greater | ~35 or greater |
| Kaplan | PSA | 3 | 200 | 25 | Unknown |
| Kulish | PSA | 3 | 125 | Unknown | Unknown |

The power set forth in the Table is larger than that required for large scale industrial PSA systems, where the typical power is 10kw/TPD or less. The power is lower for at least one of the following reasons:

1. higher separation power of superatmospheric PSA;
2. lower efficiency of smaller scale blowers; and
3. higher compression power of faster cycle processes.

While so-called "portable" concentrators having a capacity of about 2–3 lpm of oxygen do exist, such machines typically weigh more than about 20 lbs. excluding battery. Thus, there is a need to reduce the size and weight of such portable medical oxygen concentrators.

An additional problem associated with medical oxygen concentrators is that a large part of product oxygen is wasted if oxygen flow is continuously provided to the patient, since oxygen is only brought to the patient's lungs during inhalation (about ⅓ time of the breathing cycle).

Chua et al. U.S. Pat. No. 5,735,268 disclose the use of a conserver to save breathing oxygen from a source such as liquid oxygen tank to the respiratory patient.

Sato et al. in U.S. Pat. No. 4,681,099 teaches the combination of a concentrator and a conserver where an oxygen buffer tank connecting the concentrator and the conserver makes the initial oxygen flow higher than the steady flow of each inhalation phase.

SUMMARY OF THE INVENTION

The present invention combines a very fast pressure swing adsorption oxygen cycle with a high-rate adsorbent to achieve significant improvements over commercial/prior art medical oxygen concentrators. In most preferred embodiments, the cycle time may be as short as ~4 s, and the adsorbent inventory and vessel volume are decreased by a factor of at least about seven when compared with current commercial medical concentrators. In more preferred embodiments, the oxygen recovery achieved is greater than 50%. The result is a concentrator having a size, weight and power consumption that are significantly reduced when compared to the current state of the art.

In a further preferred embodiment of the present invention, the inventive portable concentrator system and process of the invention is further integrated with a conserver.

Product purity for the medical concentrators of the invention ranges from about 85 to 95% oxygen.

DETAILED DESCRIPTION OF THE INVENTION

Figure 1:
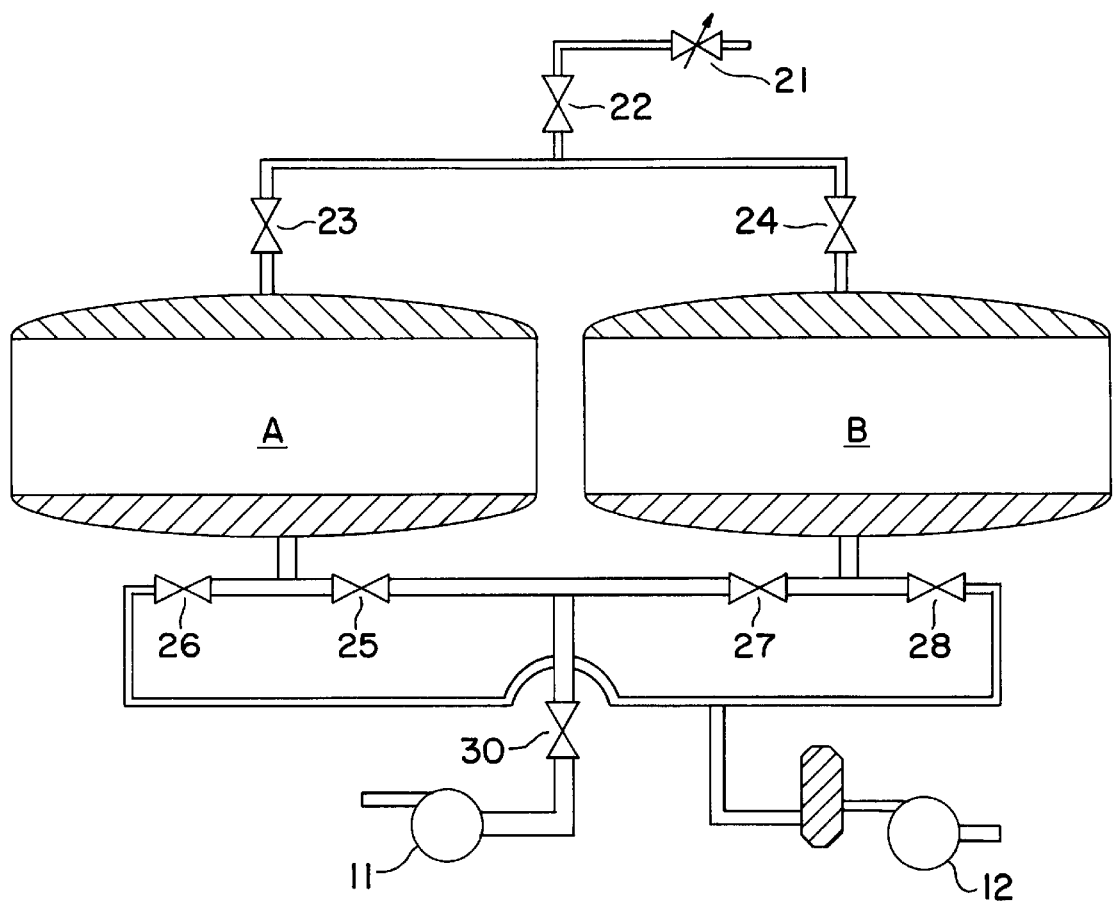
FIG. 1 is an illustration of a two-bed PSA system useful for practicing the preferred embodiments of the invention.

The invention provides an advanced medical concentrator process and system which has small size, light weight and low power consumption. It provides significant savings over current commercial stationary medical concentrators. Finally, when combined with a conserving device, it provides a portable concentrator that a patient can easily carry.

The invention has the following advantages compared with the prior art medical concentrators:

Significant process performance improvements over current commercial medical concentrators are achieved by using a very fast PSA cycle with overlapping steps and advanced adsorbents having a $MTC_{N2}$ of $\geq 100$ s−1. Preferably the adsorbents are LiX adsorbents having a $SiO_2/Al_2O_3$ ratio of between 2.0 and 2.5 and having >88% Li. Specific adsorbents may be those identified as Oxysiv-7 and X-2 (see below). The enhanced performance is represented by the following three parameters: BSF<300 lb/TPD, preferably <250 lb/TPDO, more preferably $\leq 140$ lbs/TPDO, more preferably $\leq 90$ lbs/TPDO and most preferably $\leq 50$ lbs/TPDO; recovery $\geq 35\%$, preferably $\geq 40\%$, more preferably $\geq 50\%$, and most preferably $\geq 60\%$; power $\leq 30$ kW/TPDO, preferably $\leq 25$ kW/TPDO, more preferably $\leq 15$ kw/TPDO for producing $\leq 15$ LPM $O_2$ at a purity of >85%.

The small BSF means the present invention only uses a fraction of the adsorbent amount required in current commercial units. This significantly reduces adsorbent weight, adsorbent container weight and bed size.

The high recovery achieved allows a much smaller and lighter compressor and less power consumption.

The combination of less adsorbent, smaller adsorbent bed and smaller compressor reduces, in turn, other associated components such as the casing of the concentrator. The resulting concentrator system is significantly enhanced, having a much smaller size, lighter weight and reduced power consumption when compared to existing systems.

The enhanced system requires less air flow to handle, resulting in less noise and greater comfort to the patient.

When integrated with a conserver, the small advanced concentrator of the invention can be truly portable.

While any adsorbent having a mass transfer coefficient ($MTC_{N2}$) that is >100 s$^{-1}$ may be used, the preferred adsorbent (X-2) is a caustically digested LiX material having a silica/alumina ratio of 2.0 and >88%Li. The adsorbent is preferred to have an average particle diameter on the order of about 0.55 mm. X-2 may be made according to the following examples:

EXAMPLE I

Preparation Procedure of X-2 Sample LiX2.0CD (99%Li) (30×40 mesh)

Forming: Commercial NaKX2.0 zeolite powder was supplied by UOP. 3520 gm of NaKX2.0 (Dry weight, 4327 gm wet) and 480 gm of Ecca Tex-610 Kaolin clay (from ECC International (now Imery Corp.) (dry weight, 560 gm wet. Clay consist of 12% of the total weight of the mixture) were used to form the beads.

414.8 gm of Latex 163S (57.3% solid, from Union Carbide Corporation (now Dow, Inc.) was added to 1930 gm of water in a large beaker. Stirred, then 480 gm of Tex-610 was added. Stirred for 10 more minutes. Then a portion of NaKX2.0 (1800 gm wet) was added and stirred for 10 minutes more.

The slurry as well as the remaining NaKX2.0 zeolite powder was added to a muller and mulled for 3 hours. The mixture was then transferred into a Nauta mixer to make beads. In six hours, the process yielded product with large fraction in 30×70 range.

The beads are dried and calcined at 592° C. for 2.5 hours in air.

Caustic Digestion: A solution of 4.5% NaOH and 3.1% KOH was used to convert clay into zeolite. 80% of the solution has been saturated with alumino silicates by cooking the solution with sacrificial product beads and the remaining 20% are fresh solution of NaOH and KOH. 2141 gm of cacined beads (dry weight) were placed in a steel column, 9054 gm digestion solution was recycled through the column with a flow rate of 40 ml/min and maintained at 88° C. for 25 hours. After completion of digestion, the sample was washed in the column with 40 liter pH 12 (adjusted with NaOH) then 40 liter of pH9 water at flow rate of 40 ml/min.

Li ion exchange: A solution which contains 8% LiCl and pH adjusted to 9 with LiOH was used for ion exchange. The ion exchange was conducted in a glass column. 1625.7 gm of 30×40 beads and 54362 gm of LiCl solution were used. The solution was preheated and the column was maintained at 90° C. The solution was pumped once through at a flow rate of 60 ml/min. At the completion of Li ion exchange, the product was washed with water pH adjusted with LiOH to pH9. After Li ion exchange the product was screened Only the 30×40 fraction was used for Oxygen concentrator testing.

Drying and Calcination of LiX2.0CD 30×40 beads were placed in two large wire mesh trays with the beads layer thickness in the range of ¼ inch. The sample was dried in a dry air purged Blue M oven with ample purge, The oven temperature was raised to 135° C. in 3 hours and maintained at 135° C. for 3 more hours. The LOI of the dried beads was 10.7%. The dried beads were placed in a high temperature Blue M oven. The oven was purged with dry air. The oven temperature was raised to 593° C. in about 2 hours, and maintained at 593° C. for 40 minutes. The sample was removed at about 530° C. and put into a glass jar with a lid and sealed off from air until the time of testing. The screen sizing of the product showed it had a mean diameter of 0.49 mm.

EXAMPLE II

Preparation Procedure of Sample X-2 (LiX2.0CD (99%Li) (20×50))

The procedure is the same as that described above, except the cut of the bead size was broadened to 20×50. The screen analysis of the final calcined product had a mean diameter of 0.54 mm.

Instead of the latex in the above examples, other materials such as styrene-butadiene copolymers, butadiene and acrylonitirle copolymrs, acrylic, vinyl acrylic, styrene acrylic, styrene, epoxy, phenolic, ethylene polymers, polysaccharides (such as starch), plant gums, gelatins, polyacrylamide, polythylene oxide, polyvinyl alcohol, cellulose ethers, and derivatives of all these polymers may be utilized.

The preferred PSA cycle for the present invention uses a two-bed apparatus such as that illustrated in FIG. 1. The cycle steps are illustrated in FIG. 2, and consist of the following:

1. Simultaneous feed and product pressurization (FP/PP),
2. Adsorption (AD),
3. Equalization (EQ),
4. Evacuation (EV),
5. Evacuation and purge (EV),
6. Simultaneous equalization and feed (EQ/FP).

Figure 2:
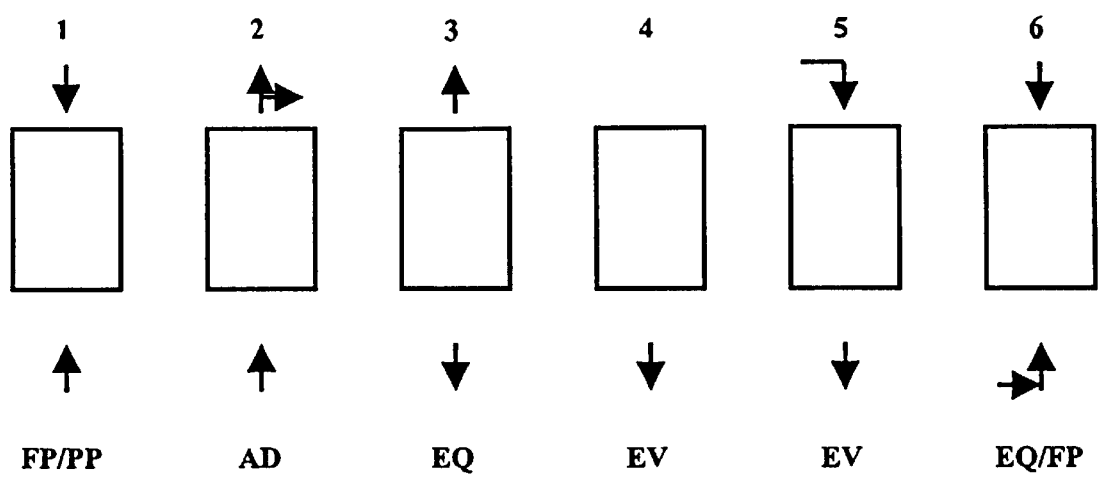
FIG. 2 is a representative process cycle of a preferred embodiment of the invention.

During step 1 (FP/PP) with reference to the two-bed configuration in FIG. 1 and the process cycle in FIG. 2, air containing oxygen and nitrogen is compressed in compressor 11 and sent to bed A through valves 30 and 25. At the same time, high pressure oxygen product is countercurrently introduced at the top of bed A through valves 21, 22 and 23 for product pressurization.

When the pressure in the bed reaches adsorption level, step 2 (AD) starts. One portion of oxygen flows from bed A through valves 23, 22 and 21 and collected as product. The other portion is directed through valve 24 as purge gas to bed B. During all these times (steps 1 and 2), bed B is undergoing two evacuation steps (step 4 blowdown and evacuation, step 5, evacuation) through valve 28 and using evacuation pump 12. (Note that when Bed A undergoes steps 4 and 5 valve 26 is open).

When oxygen purity leaving bed A is no longer acceptable (e.g. is less than 85% in this case), valve 22 is closed. Valve 28 is also closed while valves 23 and 24 are open, and step 3 (EQ) starts for bed A. While for bed B, it is step 6 (EQ/FP), and air is fed at the bottom end via valve 27 during the top equalization. When the pressures between the two beds are approximately equal to each other, equalization steps (EQ and EQ/FP) are stopped, and the second half of the cycle (where Bed B undergoes steps 1–3 and Bed A undergoes steps 4–6) takes place. Those skilled in the art will recognize that equalization could be terminated earlier if the oxygen purity leaving the high pressure bed becomes too low compared to the desired product purity, as the recovery and power would no longer be improved at a given product purity.

The overlapping steps allow for a continuous feed and reduce the cycle time. In addition, the continuous feed minimizes the adverse effects of the feed end void on the process performance, since feed end piping remains pressurized continuously at or near the high adsorption pressure.

The cycle may be further simplified by eliminating the equalization steps in short cycle applications of the process. The transfer of gas between beds in the equalization steps becomes negligible and the inconsequential to the performance of short cycle processes.

Representative process conditions are as follows: the desorption/adsorption pressures are 0.25/2.0 bars for vacuum PSA (VPSA) respectively, preferably 0.5/1.5 and 1/6 bars respectively for super-atmospheric PSA, preferably 1/3; and the temperature is ambient (e.g. 25° C.); the average molar feed ($O_2$ and $N_2$) flow range is about 10–100 mol/s/$m^2$, preferably 15 mol/s/$m^2$; the ratio of the total external void volume to the adsorbent bed volume is typically less than 50%, preferably less than 30%; the process cycle times are less than about 10 s preferably less than 6 s; and the pressure drop per unit length is less than 6 psi/ft.; preferably between 1–2 psi/ft. The external void space is the combined space from the bottom and top of the adsorbent bed to the first valves in the inlet and outlet flow paths.

Specific, non-limiting examples of this cycle for both VPSA (transatmospheric) and PSA (superatmospheric) are set forth below:

| Steps | Start:end pressure range (bars) | Time (s) |
|---|---|---|
| VPSA 4" bed 0.5–1.5 bars, cycle time 4s, BSF 50 lb/TPD, Recovery 60% | | |
| 1. FP/PP | 0.6:1.2 | 1 |
| 2. AD | 1.2:1.5 | 0.9 |

-continued

| Steps | Start:end pressure range (bars) | Time (s) |
|---|---|---|
| 3. EQ | 1.5:1.4 | 0.1 |
| 4. EV | 1.4:0.8 | 1 |
| 5. EV/PG | 0.8:0.5 | 0.9 |
| 6. EQ/FP | 0.5:0.6 | 0.1 |
| PSA 6" bed 1–3 bars, cycle time 9s, BSF 100 lb/TPD, Recovery 50% | | |
| 1. FP/PP | 1.1:1.4 | 2.2 |
| 2. AD | 1.4:3 | 2.2 |
| 3. EQ | 3:2.9 | 0.1 |
| 4. EV | 2.9:1.1 | 2.2 |
| 5. EV/PG | 1.1:1.0 | 2.2 |
| 6. EQ/FP | 1.0:1.1 | 0.1 |

The use of this cycle when combined with adsorbents having an $MTC_{N2} \geq 100$ s−1 (e.g. X-2 and Oxysiv-7) results in significant improvements in recovery, BSF and power.

The mass transfer coefficient $k_i$ can be determined by fitting the appropriate model to data obtained from a breakthrough experiment.

Since the sorption rate has been quantified for the examples herein, the breakthrough experiment employed to obtain the mass transfer rate coefficients is briefly described below. One skilled in the art will recognize that variations of this experiment may be used.

Figure 3:
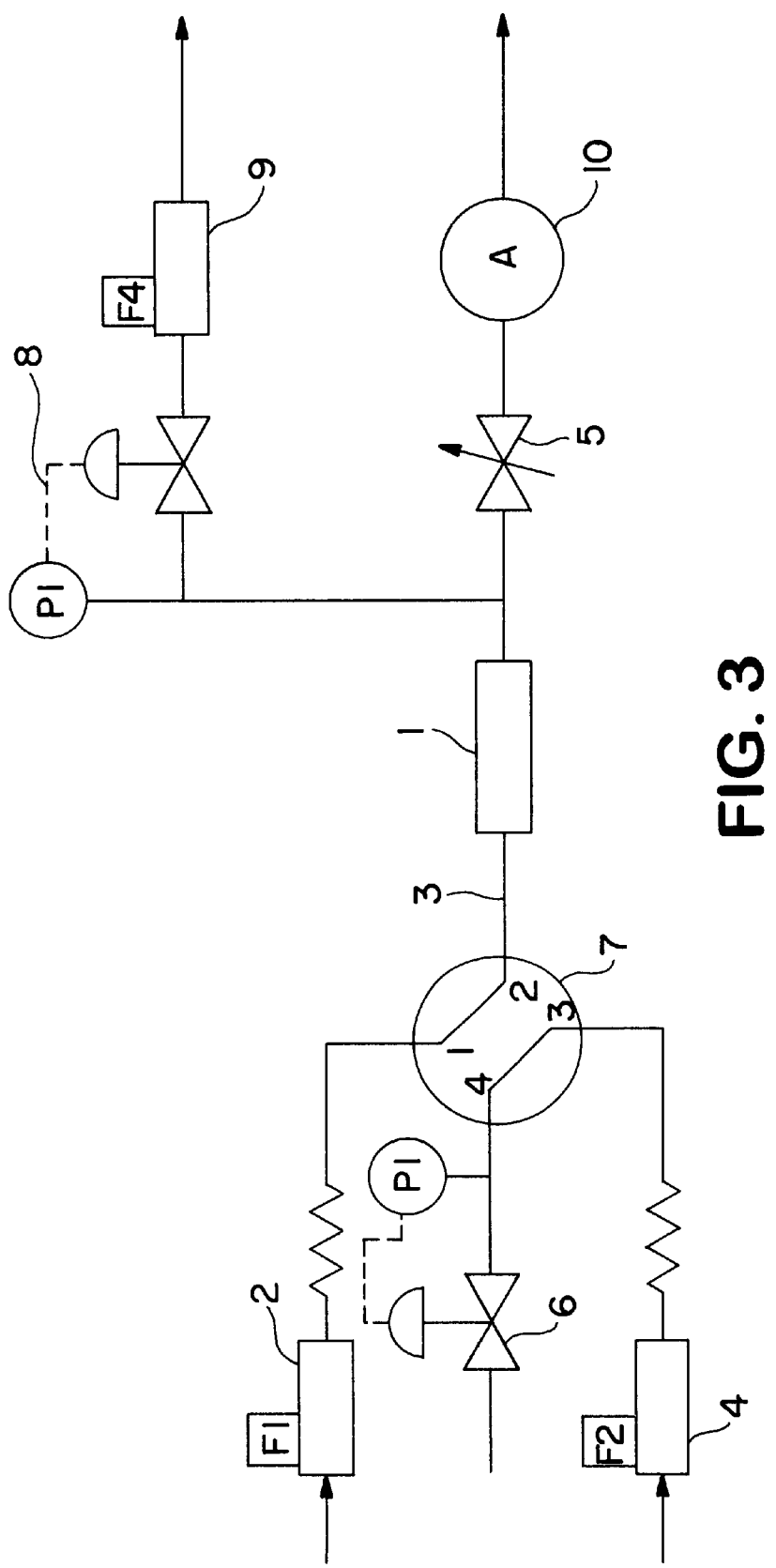
FIG. 3 is a schematic diagram showing the apparatus used to measure intrinsic adsorption rate.

For the process of air separation, a breakthrough test is performed in two steps in which the flow rate, pressure and temperature of the feed gas are the same in both steps. With reference to FIG. 3, this process will be described. The first step involves saturation of the adsorbent bed 1 with $O_2$ the least selective component provided via flow meter 4 and line 3. In the second step, air or a synthetic air mixture containing $N_2$ and $O_2$ is then introduced to bed 1 via flow meter 4 and line 3. Valve 6 operates in conjunction with flow meter 2 such that pressure of the air or synthetic air is maintained in an external loop until the four port valve 7 connects the air/synthetic air feed to line 3 such that the air/synthetic air flows into bed 1. The pressure, temperature and composition of the feed mixture in the second step should be representative of that in an adsorption step of an actual process, e.g. 1.5 bar, 300°K and feed air composition. The molar flux was approximately 10 mol/m$^2$s, although this flux may be varied as required. The pressure is maintained substantially constant in the bed 1 by using a control valve 8 located on the downstream side of the adsorbent bed. The endspace and connecting piping volumes (dead volumes) are designed to be 5% or less than that of the adsorbent bed volume (approximately 20 cm$^3$)

The flow rate and concentration of $O_2$ are continuously and accurately monitored throughout step two via flow meter 9 and oxygen analyzer 10 until the breakthrough of $N_2$ is complete. Flow to analyzer 10 is maintained at a fixed amount via fixed valve 5. In step two, the more selectively adsorbed $N_2$ displaces the adsorbed $O_2$ already in the bed 1. As the bed nears saturation with the air mixture, the breakthrough of $N_2$ is reflected in a decrease in the $O_2$ concentration and an increase in overall flow rate of the effluent from the bed. The piping and adsorbent bed are maintained at the same temperature as the feed by immersing them in a thermostat bath controlled at the same temperature as the feed.

A computer model representing the test is then applied to simulate the breakthrough test. A detailed adsorption model, based upon the governing material and energy balances involved in the process, is incorporated. This model uses the expression $$\rho_b \frac{\partial \overline{w_i}}{\partial t} = k_i(c_i - \overline{c_{si}})$$

where ($w_i$) is the average loading of adsorbate (i), $\rho_b$ is the packed density of the adsorbent in the bed, $C_i$ and $C_{si}$ are average adsorbate gas phase concentrations in the bulk fluid and inside the particle in equilibrium with the adsorbate loading, respectively. The model used here is represented by one dimensional plug flow with negligible axial dispersion. Additional characteristics of the model include: pressure drop (as determined by Darcy's Law or by the Ergun Equation), multicomponent isotherm (as determined by the loading ratio correlation), and adsorption rate (as determined by the linear driving force). A nonisothermal energy balance was used to account for heat transfer through the wall of the adsorbent bed. Simulations were performed by varying the mass transfer rate coefficients, $k_{N_2}$ and $k_{O_2}$ until the breakthrough effluent flow rate and concentration profiles of the simulation matched those of the experiment.

For assessing process performance of the present invention, both computer simulations and laboratory tests have been performed for X-2 adsorbent. Computer simulations were used for Oxysiv-7.

The two bed PSA configuration illustrated in FIG. 1 and the process of FIG. 2, was used in the simulations and tests for X-2 and Oxysiv-7. Small beads (i.e., ~0.5 mm diameter, approximately the same size as commercial Oxysiv-7) in combination with the high intrinsic diffusivity of X-2 are used to provide the high overall mass transfer rate.

The results of the simulations show significant process enhancements as illustrated in Table 2. The power given in Table 2 for cases associated with the invention were determined on the basis of the same overall system power efficiency as that of commercial concentrators.

TABLE 2

Comparison of the invention and prior art

| | | Performance | | |
|---|---|---|---|---|
| Systems | Process Type | BSF (lb/TPD) | Recovery (%) | Power (kW/TPD) |
| Invention (X-2) | VPSA | 50 | 60 | ~15 |
| | PSA | 90 | 50 | ~25 |
| Invention (Oxysiv-7) | VPSA | 140 | 40 | ~25 |
| | PSA | 250 | 35 | ~30 |
| Commercial concentrators | (V)PSA | ~400 | ~35 | 30–40 |
| Kaplan | PSA | 200 | 25 | Unknown |
| Kulish | PSA | 125 | unknown | Unknown |

As can be seen from the table, Oxysiv-7, used with the advanced process concepts of this invention, can be used to provide some improvements to commercial medical concentrators. It is also clear that further significant improvements are achieved by using X-2 adsorbent.

The Table illustrates an adsorbent inventory of X-2 that is about three times smaller compared to Oxysiv-7 and about eight times smaller compared to the above described commercial concentrators. The recovery associated with X-2 is increased by up to about one and one-half times that of Oxysiv-7, while power consumption is nearly halved. It should be noted that the use of Oxysiv-7 in the process of the invention achieves a modest improvement in recovery and power but with a significant decrease in SSF when compared to commercial concentrators.

The reason for the improvements in concentrators using X-2 compared to those incorporating Oxysiv-7 is due to the enhanced mass transfer coefficient (MTC) of X-2. More specifically, for the small particle diameters required in the medical concentrators, it has been found that X-2 provides a faster rate of adsorption than that of Oxysiv-7 of the same particle size.

TABLE 3

Adsorbent rate comparison

| Designation | Zeolite ($SiO_2/Al_2O_3$) | Particle diameter $D_p$ mm | $MTC_{N2}$ $s^{-1}$ |
|---|---|---|---|
| Oxysiv-7 | LiX(2.5) | 0.55 | 100 |
| X-2 | LiX(2.0) | 1.25 | 40 |
| X-2 | LiX(2.0) | 0.55 | 206 |

At the same particle size (i.e., 0.55 mm), X-2 gives a $MTC_{N2}$ of about $200s^{-1}$ which is about twice that of the best commercial adsorbent, as illustrated in Table 3.

It is worth noting that a smaller diameter than 0.55 mm may be used if a higher mass transfer rate is desired, and if increased pressure drop and increased axial dispersion in the bed are small and acceptable for the process.

Figure 4:
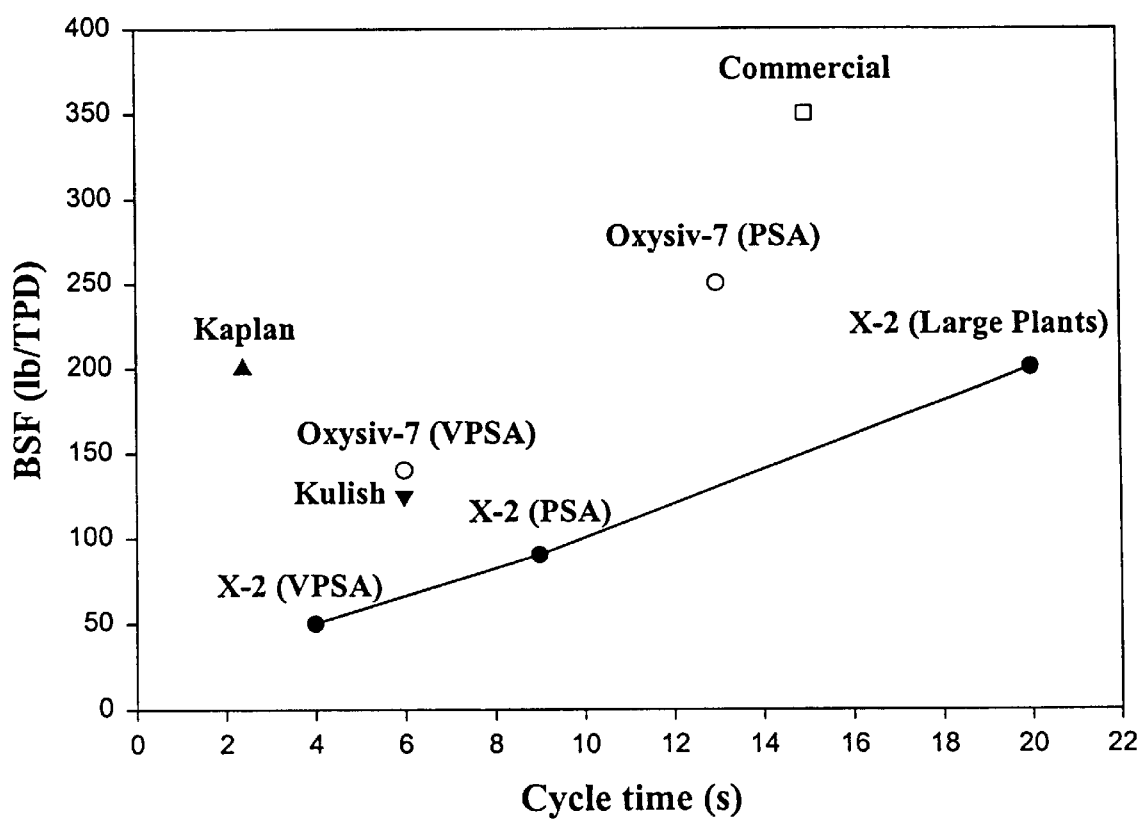
FIG. 4 is a graphical comparison of the invention with prior art systems.

The improved process performance associated with this invention results in a significantly improved concentrator system. Since a very small BSF is achieved (as shown in FIG. 4), less adsorbent is then required for delivering the same amount of oxygen by the concentrator.

Figure 5:
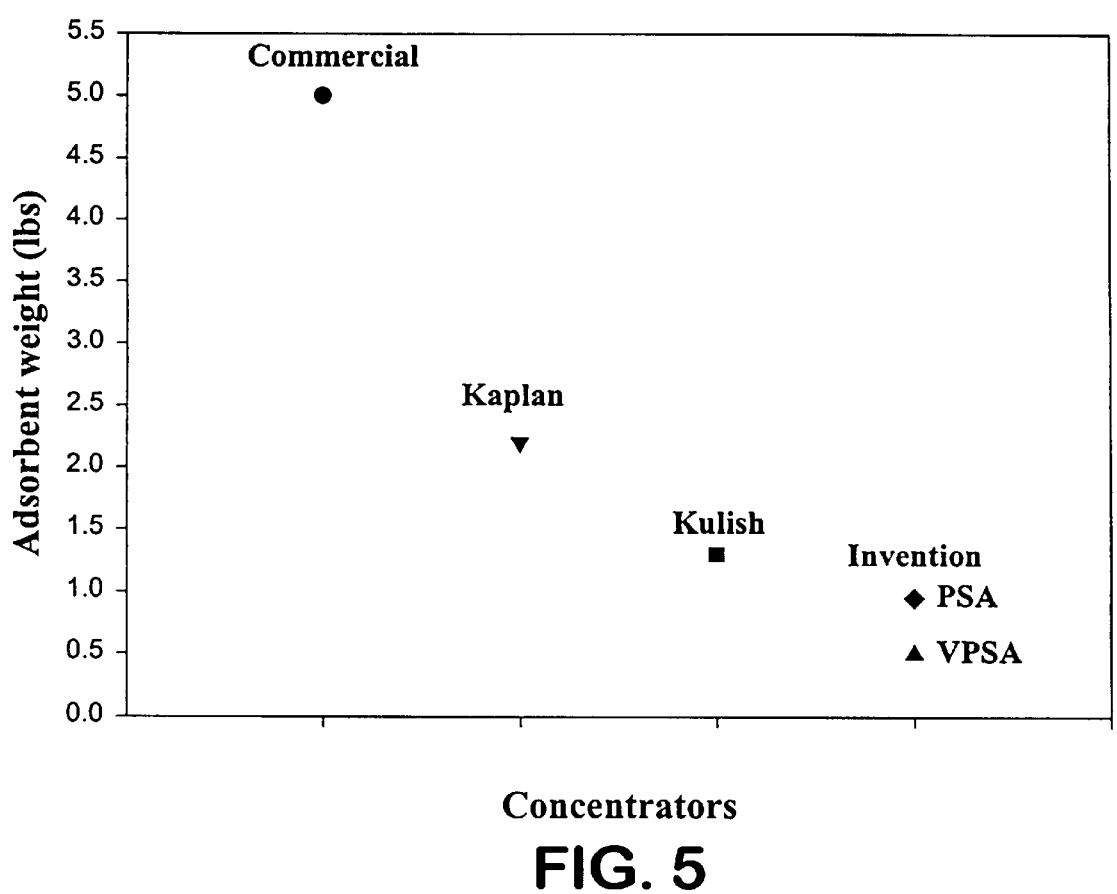
FIG. 5 is a graphical comparison of the adsorbent weight required for the present invention and prior art systems.

FIG. 5 compares the adsorbent weights for a representative concentrator capacity of 5 LPM. The present invention requires as little as 0.5 lb. of X-2 adsorbent in the VPSA case or 0.95 lb. in the PSA case. This is about 60% or 25%, respectively, less than Kulish and Swank (e.g. 1.3 lb.). The smaller amount of adsorbent yields, in turn, smaller adsorbent beds, and reduces the overall concentrator volume and weight.

Much higher oxygen recovery (e.g. one and one-half times or higher) is achieved by the most preferred embodiments of the invention, and consequently less air needs to be compressed and fed into the concentrator for a given oxygen production capacity. Therefore, a smaller and lighter compressor can be utilized. Note that in the VPSA case, a vacuum pump would be required. The vacuum could be provided either by a separate machine or as an integral vacuum chamber driven by the same compressor motor. Thus, the VPSA case may demand an overall slightly larger machine (in size and weight) in comparison with the PSA case, but provides significantly higher recovery (>60%) and much lower power consumption.

It is estimated that at least about 30% of reduction in overall size and weight could be achieved i7by the present invention over current commercially available stationary concentrators (5 LPM $O_2$ delivery systems), with even greater reductions in size and weight achievable for portable (2–3 LPM) systems.

As indicated above, the smaller concentrator of the invention also consumes less power, which when taken together with the higher recoveries achieved, is much more efficient (per unit amount of product) than prior systems.

As the compressor, adsorbent and adsorbent bed are major contributors to the concentrator cost, the large reductions in these parameters can significantly reduce the concentrator unit cost. Moreover, a small compressor and reduced air flow reduce the system noise. This results in greater comfort for the user of the concentrator of the present invention compared to existing commercial concentrators.

Ideally, a portable concentrator should be less than 10 lb in total weight, be no more than 1,000 $in^3$ in size and have at least 6–8 hours of battery life. The improvements in process and system achieved by the present invention provide such previously unattainable portability. When the inventive concentrator is combined with a conserver a truly portable concentrator producing 2–3 LPM of breathing capacity is achieved.

In one non-limiting embodiment, the integrated portable concentrator system consists of the advanced PSA or VPSA concentrator (including compressor, adsorbent, beds, casing, etc.) as described above in the present invention, an oxygen product storage tank and a conserver all located inside the concentrator casing). The invention may also be applicable to VSA systems, as long as means for supplying the product at the required delivery pressure are provided.

The PSA concentrator is operated continuously at the reduced capacity according to the ratio provided by the conserver. The produced oxygen is then stored during each breathing cycle in the oxygen product tank that is properly scaled according to the patient's need and the conserver properties. The conserver delivers an adequate amount of oxygen and flow pattern from the tank to the patient during each cycle. Such an embodiment can maximize the benefits of the conserver and minimize the PSA concentrator size, weight and power. For example, if a 3 LPM of oxygen flow is required for the patient's inhalation and the conserver saving ratio is 4:1, then only a small PSA concentrator producing continuous flow of 0.75 lpm is needed. The greater the conserver saving ratio, the greater the reduction in the PSA concentrator, and the smaller and more portable the integrated system.

In another non-limiting embodiment, the conserver could be close to the nose of the user (e.g., in a chest pocket) such that the tubing between the conserver and the PSA beds could be used as oxygen storage. This would eliminate the need of a product tank.

In a further non-limiting embodiment, no product tank is needed. The PSA concentrator is scaled and controlled in such a way that it works only on demand and instantaneously produces the adequate amount and pattern of oxygen to the patient. For example, the PSA concentrator can be driven by the modulation of a linear compressor.

The present portable concentrator can achieve much longer life between battery recharges than any other concentrators for a given battery size due to its lower power consumption of the present invention process, especially when combined with a conserver.

While this invention provides an advanced medical concentrator, the principles of this invention apply to other separations or purification targeting fast process cycles, in particular air separations. It would apply to any system requiring light weight, compact size, low power and low cost.

The system, although presented here with two-bed embodiment, could be practiced with additional or fewer beds. The bed configuration and/or flow configuration is not limited to conventional axial flow adsorbers, and could be applied to radial flow and lateral flow adsorbers, etc. In addition, a bed could be segmented (or divided, structured) and each segment could function as an individual adsorbent bed.

The invention is not restricted to a specific adsorbent. Any adsorbent having a $MTC_{N2} \geq 100$ $s^{-1}$ may be used. Representative materials include materials selected from A-zeolite, Y-zeolite, NaX, mixed cation X-zeolite, LiX, chabazite, mordenite, clinoptilolite, silica-alumina, alumina, silica, and titanium silicates which have been treated by methods known to those skilled in the art to increase MTAC Moreover, the invention is not limited to a single adsorbent. Multiple adsorbents could be employed. Also, adsorbents could be layered or mixed, constrained or unconstrained.

Gas switching which constitutes process sequence is not limited to the means of solenoid valves, rather it could be any pressure variation generating or control means, for example, a rotary valve or bed, etc. assembly etc.

The use of a conserver integrated to the concentrator is not limited to the portable unit, and can also be employed in stationary concentrators.

Although the process of the invention is preferably operated near atmospheric pressures and ambient temperature, it could be applied to a full range of process conditions, e.g., pressures, temperature, and flow rate, feed velocities, etc.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A pressure swing adsorption (PSA) process for the production of up to 15 LPM of oxygen from air said process using at least one adsorbent bed and comprising the steps of:
   a) adsorption of nitrogen from said air onto said at least one bed of adsorbent;
   b) recovery of oxygen from said air having a purity of 85 vol. % to 95 vol. %,
   c) desorption of nitrogen from said at least one bed of adsorbent; wherein
      said adsorbent has a mass transfer coefficient ($MTC_{N2}$) that is $\geq 100$ s$^{-1}$;
      said recovery of oxygen from said air is $\geq 35\%$, when said purity is 90 vol. % and
      the bed size factor (BSF) is less than 300 pounds adsorbent/TPDO.

2. The process of claim 1, wherein the total time for a single adsorption/desorption cycle is less than 10 seconds.

3. The process of claim 1, wherein said BSF is $\leq 250$ pounds adsorbent/TPDO.

4. The process of claim 1, wherein said BSF is $\leq 140$ pounds adsorbent/TPDO.

5. The process of claim 1, wherein said BSF is $\leq 90$ pounds adsorbent/TPDO.

6. The process of claim 1, wherein said BSF is about 50 pounds adsorbent/TPDO.

7. The process of claim 1, wherein said mass transfer coefficient ($MTC_{N2}$) is $\geq 150$ s$^{-1}$.

8. The process of claim 1, wherein said mass transfer coefficient ($MTC_{N2}$) is about 200 s$^{-1}$.

9. The process of claim 1, wherein said recovery of oxygen from said air is $\geq 40\%$, when said purity is 90 vol. %.

10. The process of claim 1, wherein said recovery of oxygen from said air is $\geq 50\%$, when said purity is 90 vol. %.

11. The process of claim 1, wherein said recovery of oxygen from said air is greater than 60%, when said purity is 90 vol. %.

12. The process of claim 1, wherein said process uses two beds of adsorbent.

13. The process of claim 1, wherein said process has a total power requirement is less than or equal to 25 kw/TPDO.

14. The process of claim 1, wherein said process has a total power requirement is less than or equal to 15 kw/TPDO.

15. The process of claim 1, wherein said desorption is performed under subatmospheric conditions.

16. The process of claim 1, wherein said adsorbent is a LiX adsorbent having a $SiO_2/Al_2O_3$ ratio of between 2.0 and 2.5.

17. The process of claim 16, wherein said LiX adsorbent has >88% Li.

18. The process of claim 1, wherein said process produces 5 LPM oxygen from air.

19. The process of claim 1, wherein said process produces 3 LPM oxygen from air.

20. The process of claim 1, further comprising passing said oxygen through a conserving device.

21. The process of claim 20, wherein oxygen is provided from said conserving device to a patient requiring oxygen.

22. The process of claim 1, wherein said adsorbent is a LiX adsorbent having a $SiO_2/Al_2O_3$ ratio of 2.0, 99% Li and a particle diameter Dp of 0.55 mm.

23. The process of claim 1, wherein said process has a continuous feed.

24. The process of claim 1, wherein said process take place in a medical oxygen concentrator.

25. The process of claim 24, wherein said medical oxygen concentrator weighs less than 15 pounds.

26. The process of claim 24, wherein said medical oxygen concentrator weighs less than 10 pounds.

27. The process of claim 1, wherein the oxygen that is recovered is provided directly to a patient requiring oxygen.

28. The process of claim 1, wherein oxygen is instantaneously produced only when a patient requires oxygen.

29. A pressure swing adsorption (PSA) apparatus for the production of up to 15 LPM of oxygen having a purity of 85 vol. % to 95 vol. % from air said apparatus comprising:
   a) at least one bed of adsorbent having a $MTC_{N2} \geq 100$ s$^{-1}$;
   b) means for recovering oxygen from said air having a purity of 85 vol. % to 95 vol. %, wherein;
      said apparatus has a BSF of less than 300 pounds adsorbent/TPDO; and when said oxygen has a purity of 90 vol. %, it is produced at a recovery of greater than 35%.

30. The apparatus of claim 29, further containing a means for conserving said oxygen.

31. The apparatus of claim 29, wherein said apparatus has two beds of adsorbent.

32. The apparatus of claim 29, wherein said BSF is $\leq 250$ lbs/TPDO.

33. The apparatus of claim 29, wherein said BSF is $\leq 140$ lbs/TPDO.

34. The apparatus of claim 29, wherein said BSF is $\leq 90$ lbs/TPDO.

35. The apparatus of claim 29, wherein said apparatus is a medical oxygen concentrator.

36. The apparatus of claim 29, wherein said adsorbent is a LiX adsorbent having a $SiO_2/Al_2O_3$ ratio of between 2.0 and 2.5.

37. The apparatus of claim 36, wherein said LiX adsorbent has >88% Li.

38. The apparatus of claim 29, wherein said apparatus produces 3 LPM oxygen from air.

39. The apparatus of claim 38, wherein said apparatus has a weight of less than 15 pounds.

40. The apparatus of claim 39, wherein said apparatus has a weight of less than 10 pounds.

41. The apparatus of claim 39, wherein said adsorbent is a LiX adsorbent having a $SiO_2/Al_2O_3$ ratio of between 2.0 and 2.5.

42. The apparatus of claim 41, wherein said LiX adsorbent has >88% Li.

43. The apparatus of claim 39, wherein said adsorbent is a LiX adsorbent having a $SiO_2/Al_2O_3$ ratio of 2.0, 99 Li and a particle diameter $D_p$ of less than or equal to 0.55 mm.

* * * * *